(12) United States Patent
Luk et al.

(10) Patent No.: US 8,306,419 B2
(45) Date of Patent: Nov. 6, 2012

(54) TECHNIQUES FOR CONTROLLING A LIGHT SOURCE IN A WAVELENGTH DIVISION MULTIPLEXED PASSIVE OPTICAL NETWORK

(75) Inventors: Tom Luk, Ottawa (CA); John Bainbridge, Ottawa (CA)

(73) Assignee: LG-Ericsson Co., Ltd., Seoul (KR)

( * ) Notice: Subject to any disclaimer, the term of this patent is extended or adjusted under 35 U.S.C. 154(b) by 654 days.

(21) Appl. No.: 12/482,768

(22) Filed: Jun. 11, 2009

(65) Prior Publication Data

US 2010/0316386 A1 Dec. 16, 2010

(51) Int. Cl.
H04B 10/08 (2006.01)
(52) U.S. Cl. .......... 398/32; 398/195; 398/196; 398/197; 398/198
(58) Field of Classification Search .......... 398/32, 398/195–198
See application file for complete search history.

(56) References Cited

U.S. PATENT DOCUMENTS

| | | | | |
|---|---|---|---|---|
| 5,739,938 | A * | 4/1998 | Goutzoulis et al. | 398/197 |
| 5,850,409 | A * | 12/1998 | Link | 372/38.01 |
| 2010/0014864 | A1 | 1/2010 | Hong | 398/79 |
| 2010/0021172 | A1* | 1/2010 | Kien et al. | 398/98 |
| 2010/0067907 | A1 | 3/2010 | Byun et al. | 398/58 |
| 2010/0067921 | A1 | 3/2010 | Byun et al. | 398/182 |

FOREIGN PATENT DOCUMENTS

| | | |
|---|---|---|
| KR | 10-2009-008992 A | 4/2009 |
| KR | 10-2009-008993 A | 4/2009 |
| KR | 10-2009-0117571 A | 11/2009 |
| KR | 10-2010-0009741 A | 1/2010 |

OTHER PUBLICATIONS

PCT International Search Report dated Dec. 20, 2010 issued in Application No. PCT/KR2010/003654.

* cited by examiner

Primary Examiner — Danny Leung
(74) Attorney, Agent, or Firm — Ked & Associates

(57) ABSTRACT

Techniques for controlling a light source in a wavelength division multiplexed passive optical network (WDM-PON) are disclosed. In one particular exemplary embodiment, the techniques may be realized as an apparatus for controlling a light source in a wavelength division multiplexed passive optical network (WDM-PON). The apparatus may include a digital signal processing device configured to output a pilot tone signal. The apparatus may also include an amplifier configured to modulate a modulation current and the pilot tone signal, and output an amplitude modulated signal. The apparatus may further include a capacitor configured to AC couple the amplitude modulated signal to a bias current applied to a light source; and a monitoring photodiode configured to detect an output optical signal of the light source and transmit the detected output optical signal to the digital signal processing device to control the output optical signal of the light source.

20 Claims, 6 Drawing Sheets

TECHNIQUES FOR CONTROLLING A LIGHT SOURCE IN A WAVELENGTH DIVISION MULTIPLEXED PASSIVE OPTICAL NETWORK

FIELD OF THE DISCLOSURE

The present disclosure relates generally to wavelength division multiplexed passive optical networks and, more particularly, to techniques for controlling a light source in a wavelength division multiplexed passive optical network (WDM-PON).

BACKGROUND OF THE DISCLOSURE

Over the last few decades, telecommunications carriers have been considering an inexpensive means of using optical fibers to support access to telecommunications services over a last mile of connection between residential and business customers and a central office of a telecommunications service provider. The greatest bandwidth requirement for telecommunications services for these customers is typically not greater than a couple of gigabits per second (Gbps). To support this bandwidth requirement, studies have shown that wavelength division multiplexed passive optical networks (WDM-PONs) are the access technology that has attracted the most interest and shown the greatest commercial potential.

Wavelength division multiplexed passive optical networks (WDM-PONs) provide high-speed broadband communication services using a unique wavelength assigned to each customer. Accordingly, wavelength division multiplexed passive optical networks (WDM-PONs) may protect the confidentiality of communications and easily accommodate various communication services and bandwidth capacities that may be required by customers. Also, additional customers may be easily added to wavelength division multiplexed passive optical networks (WDM-PONs) by adding a respective number of wavelengths.

In traditional wavelength division multiplexed passive optical networks (WDM-PONs), both an optical line terminal (OLT) and a plurality of optical network terminals (ONTs) may require an accurate biasing of a light source at a particular oscillation wavelength. A controlling circuit may be required to stabilize an output power of the light source. For example, the controlling circuit may adjust a bias current and/or a modulation current applied to the light source in order to maintain a desired output power detected by a monitoring photodiode (MPD).

Currently, the biasing of the light source may be monitored by detecting, via a monitoring photodiode (MPD), an average output power ($P_{AVG}$) of the light source. However, several drawbacks are associated with detecting the average output power ($P_{AVG}$) of the light sources. In particular, the average output power ($P_{AVG}$) detected by the monitoring photodiode (MPD) may not be an accurate representation of an output power of the light source. As illustrated in FIG. 1, in the event that a low injection power is applied to the light source, the light source may be properly biased. However, in the event that a high injection power is applied to the light source, the high injection power may constitute a significant portion of the average output power ($P_{AVG}$) detected by the monitoring photodiode (MPD). The monitoring photodiode (MPD) may detect a high average output power ($P_{AVG}$) from the light source (e.g., because of the high injection power) and may erroneously instruct the controlling circuit to bias the light source below a threshold voltage and/or current (e.g., putting the light source in an OFF-state) and thus decrease the transmitted power. Also, by erroneously biasing the light source below a threshold voltage and/or current, an optical eye may be distorted due to a delay when turning the light source ON and OFF.

In view of the foregoing, it may be understood that there may be significant problems and shortcomings associated with current wavelength division multiplexed passive optical network (WDM-PON) technologies using seed injected Fabry Perot laser diode (FP-LD) and/or a reflective semiconductor optical amplifier (RSOA) transmitter source.

SUMMARY OF THE DISCLOSURE

Techniques for controlling a light source in a wavelength division multiplexed passive optical network (WDM-PON) are disclosed. In one particular exemplary embodiment, the techniques may be realized as an apparatus for controlling a light source in a wavelength division multiplexed passive optical network (WDM-PON). The apparatus may comprise a digital signal processing device configured to output a pilot tone signal. The apparatus may also comprise an amplifier configured to modulate a modulation current and the pilot tone signal, and output an amplitude modulated signal. The apparatus may further comprise a capacitor configured to AC couple the amplitude modulated signal to a bias current applied to a light source; and a monitoring photodiode configured to detect an output optical signal of the light source and transmit the detected output optical signal to the digital signal processing device to control the output optical signal of the light source.

In accordance with other aspects of this particular exemplary embodiment, the digital signal processing device may further comprise a modulation current control to generate the pilot tone signal.

In accordance with further aspects of this particular exemplary embodiment, the digital signal processing device may further comprise a bias current control configured to control the bias current via a DC bias source.

In accordance with additional aspects of this particular exemplary embodiment, the digital signal processing device may further comprise a monitoring photodiode detector configured to receive the detected output optical signal from the monitoring photodiode.

In accordance with further aspects of this particular exemplary embodiment, the pilot tone signal may comprise at least one of a logic low pilot tone signal and a logic high pilot tone signal.

In accordance with additional aspects of this particular exemplary embodiment, the logic low pilot tone signal may be represented by $B \sin(\omega_0 t \pm \pi)$ and the logic high pilot tone signal is represented by $A \sin(\omega_0 t)$.

In accordance with yet another aspect of this particular exemplary embodiment, the modulation current may represent transmitted data of at least one of a logic low data state and a logic high data state.

In accordance with other aspects of this particular exemplary embodiment, the pilot tone signal may comprise a constant amplitude or a variable amplitude.

In accordance with further aspects of this particular exemplary embodiment, the monitoring photodiode may be configured to transmit the detected output optical signal to the digital signal processing device via a trans-impedance amplifier.

In accordance with additional aspects of this particular exemplary embodiment, the digital signal processing device may be further configured to store a calibrated amplitude, wherein the calibrated amplitude may be determined by the digital signal processing device based on the detected output optical signal.

In another particular exemplary embodiment, the techniques may be realized as a method for controlling a light source in a wavelength division multiplexed passive optical network (WDM-PON). The method may comprise transmitting a pilot tone signal to a light source and detecting a first output optical signal of the light source via a monitoring photodiode during a calibration period. The method may also comprise processing the first output optical signal of the light source via a digital signal processing device to identify and store a calibrated amplitude. The method may also comprise detecting a second output optical signal of the light source via the monitoring photodiode during an operation period to identify a detected amplitude and comparing the detected amplitude to the calibrated amplitude stored in the digital signal processing device. The method may further comprise adjusting at least one of a bias current and a modulation current applied to the light source based on the comparison between the detected amplitude and the calibrated amplitude.

In accordance with other aspects of this particular exemplary embodiment, the pilot tone signal may comprise at least one of a logic low pilot tone signal and a logic high pilot tone signal.

In accordance with additional aspects of this particular exemplary embodiment, the logic low pilot tone signal may be represented by $B \sin(\omega_0 t \pm \pi)$ and the logic high pilot tone signal is represented by $A \sin(\omega_0 t)$.

In accordance with another aspect of this particular exemplary embodiment, transmitting a pilot tone signal to a light source may further comprise generating the pilot tone signal via a modulation current control of the digital signal processing device.

In accordance with further aspects of this particular exemplary embodiment, transmitting a pilot tone signal to a light source may further comprise amplitude modulating a modulation current by the pilot tone signal via an amplifier to output an amplitude modulated signal.

In accordance with other aspects of this particular exemplary embodiment, the method may further comprise AC coupling the amplitude modulated signal to a bias current generated by a DC bias source.

In accordance with additional aspects of this particular exemplary embodiment, detecting a first output optical signal of the light source via a monitoring photodiode during a calibrated period may further comprise transmitting the first detected output optical signal to a monitoring photodiode current detector of the digital signal processing device via a trans-impedance amplifier.

In accordance with another aspect of this particular exemplary embodiment, processing the first output optical signal of the light source may further comprise extracting a sinusoidal portion of the first output optical signal to identify the calibrated amplitude.

In accordance with other aspects of this particular exemplary embodiment, adjusting at least one of a bias current and a modulation current applied to the light source may further comprise adjusting at least one of a modulation current control of the digital signal processing device and a bias current control of the digital signal processing device.

In accordance with further aspects of this particular exemplary embodiment, the pilot tone signal may comprise a constant amplitude or a variable amplitude.

In accordance with additional aspects of this particular exemplary embodiment, the method may further comprise at least one processor readable storage medium for storing a computer program of instructions configured to be readable by at least one processor for instructing the at least one processor to execute a computer process for performing the method.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosures reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
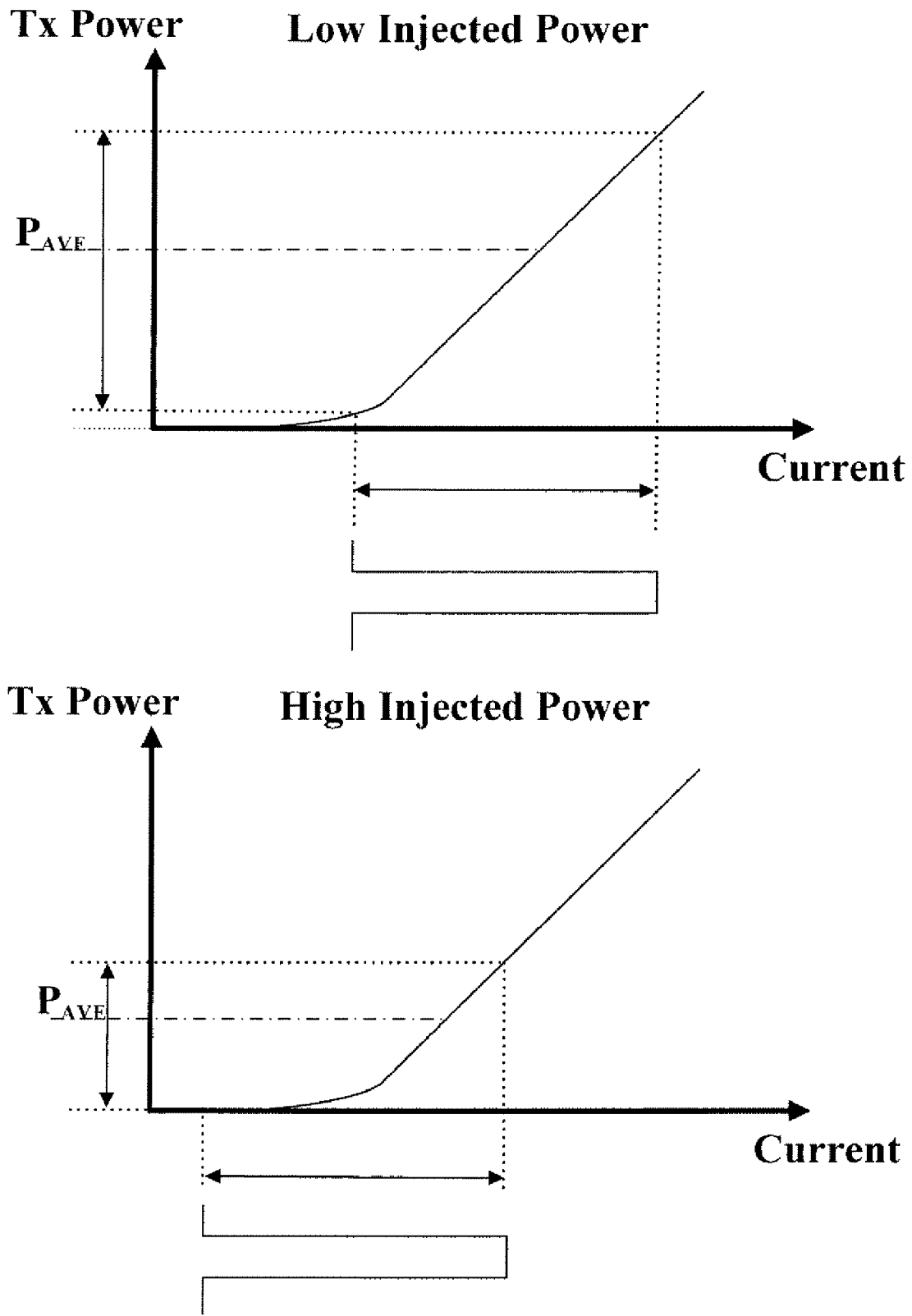
FIG. 1 shows a graph illustrating the relationship between transmitted optical power and biasing current/voltage in a traditional wavelength division multiplexed passive optical network (WDM-PON).
Figure 2:
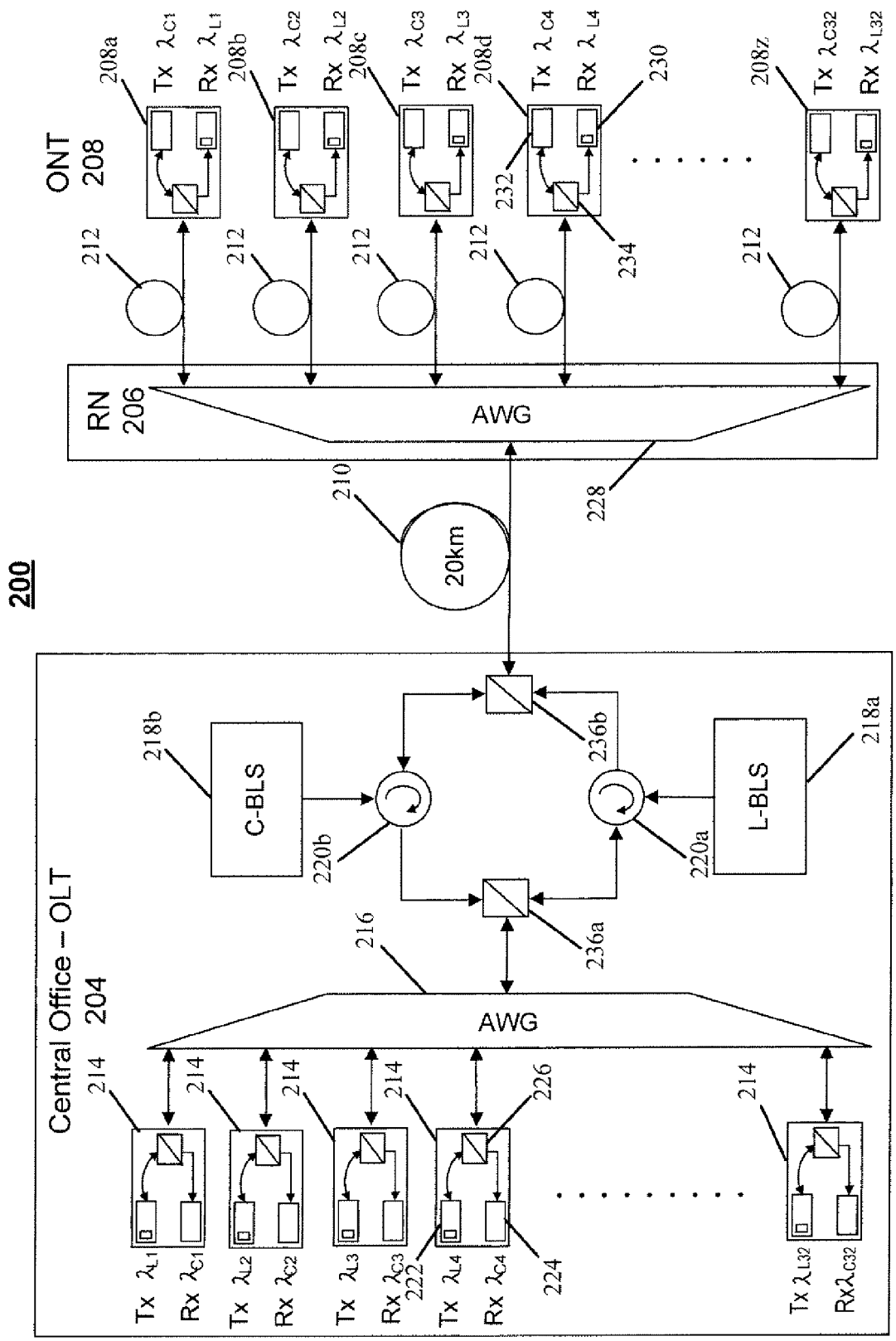
FIG. 2 shows an embodiment of a wavelength division multiplexed passive optical network (WDM-PON) in accordance with an embodiment of the present disclosure.

Referring to FIG. 2, there is shown an embodiment of a wavelength division multiplexed passive optical network (WDM-PON) 200 in accordance with an embodiment of the present disclosure. That is, the wavelength division multiplexed passive optical network (WDM-PON) 200 may comprise an optical line terminal (OLT) 204 (e.g., a central office of a telecommunications service provider) coupled to a remote node (RN) 206 (e.g., a multiplexer/demultiplexer) via an optical fiber 210. The remote node (RN) 206 may be coupled to a plurality of optical network terminals (ONTs) 208 via a plurality of optical fibers 212. Each of the plurality of optical network terminals (ONTs) 208 may maintain a connection with one or more customers (not shown) for facilitating telecommunications services between these customers and a telecommunications service provider.

The optical line terminal (OLT) 204 may include a plurality of transceiver assemblies 214, a multiplexer/demultiplexer 216 (e.g., 1×N waveguide grating) for demultiplexing a multiplexed upstream signal and/or multiplexing downstream signals from the plurality of transceiver assemblies 214, two broadband light sources 218 (e.g., first broadband light source 218a and second broadband light source 218b) for outputting optical signals with different wavelengths, two optical circulators 220 (e.g., first optical circulators 220a and second optical circulators 220b) for coupling the optical signals generated by the two broadband light sources 218 to the upstream and downstream signals, and two optical band splitting filters 236 (e.g., first optical band splitting filter 236a and second optical band splitting filter 236b). Each of the plurality of transceiver assemblies 214 may include a downstream wavelength-seeded light source (Tx) 222 (e.g., Fabry Perot laser diode (FP-LD) and/or a reflective semiconductor optical amplifier (RSOA)) and an upstream optical receiver (Rx) 224 coupled to an optical band splitting filter 226.

The remote node (RN) 206 may include a multiplexer/demultiplexer 228 (e.g., a 1×N waveguide grating) for demultiplexing a multiplexed downstream signal from the optical line terminal (OLT) 204 and/or multiplexing upstream signals from the plurality of optical network terminals (ONTs) 208. It may be appreciated by one having ordinary skill in the art that the multiplexer/demultiplexer 216 and 228 may each be capable of simultaneously multiplexing and demultiplexing inputted signals.

Each of the plurality of optical network terminals (ONTs) 208 may include a downstream optical receiver (Rx) 230 and an upstream wavelength-seeded light source (Tx) 232 (e.g., Fabry Perot laser diode (FP-LD) and/or a reflective semiconductor optical amplifier (RSOA)) coupled to an optical band splitting filter 234.

In operation, the first broadband light source 218a of the optical line terminal (OLT) 204 may generate and output a broadband signal for downstream signals from the plurality of downstream wavelength-seeded light source (Tx) 222. The broadband signal may be coupled to the multiplexer/demultiplexer 216 and spectrally sliced into a plurality of channels of signals. Each spectrally sliced channel signal from the multiplexer/demultiplexer 216 may be injected into a respective downstream wavelength-seeded light source (Tx) 222 via a respective optical band splitting filter 226. Each downstream wavelength-seeded light source (Tx) 222 may output a downstream optical signal having the same wavelength as the spectrally sliced channel signal that was injected via its respective the optical band splitting filter 226. Each downstream signal outputted from each downstream wavelength-seeded light source (Tx) 222 may be modulated in accordance with the downstream data to be transmitted. Also, each downstream signal outputted from the downstream wavelength-seeded light source (Tx) 222 may be coupled to the multiplexer/demultiplexer 216 via its respective optical band splitting filter 226 and multiplexed by the multiplexer/demultiplexer 216. The multiplexed downstream signal may be transmitted to the optical fiber 210 via the circulator 220a and subsequently transmitted to the remote node (RN) 206.

The multiplexed downstream signal transmitted to the remote node (RN) 206 may be inputted to the multiplexer/demultiplexer 228 and demultiplexed. The demultiplexed downstream signals may be transmitted to the plurality of optical network terminals (ONTs) 208 via the plurality of optical fibers 212.

The second broadband light source 218b of the optical line terminal (OLT) 204 may generate and output a broadband signal for upstream signals from the plurality of optical network terminals (ONTs) 208. The broadband signal generated by the second broadband light source 218b may be transmitted to the multiplexer/demultiplexer 228 of the remote node (RN) 206 via the circulator 220b and the optical fiber 210. The multiplexer/demultiplexer 228 may spectrally slice the broadband signal into a plurality of channels of signals. Each spectrally sliced channel signal may be transmitted to a respective optical network terminal (ONT) 208 via a respective optical fiber 212. Each spectrally sliced channel signal may then be injected into a respective upstream wavelength-seeded light source (Tx) 232 via a respective optical band splitting filter 234.

Each upstream wavelength-seeded light source (Tx) 232 may output an upstream optical signal having the same wavelength as the spectrally sliced channel signal that was injected via a respective optical band splitting filter 234. Each upstream signal outputted from each upstream wavelength-seeded light source (Tx) 232 may be modulated in accordance with the upstream data to be transmitted.

Each upstream signal outputted from each upstream wavelength-seeded light source (Tx) 232 may be coupled to the remote node (RN) 206 via its respective optical band splitting filter 234. The plurality of upstream signals transmitted to the remote node (RN) 206 may be inputted into the multiplexer/demultiplexer 228 to be multiplexed. The multiplexed upstream signal may be transmitted to the optical line terminal (OLT) 204 via the optical fiber 210. Also, the multiplexed upstream signal transmitted to the optical line terminal (OLT) 204 may be inputted into the multiplexer/demultiplexer 216 via the circulator 220b to be demultiplexed. Each demultiplexed upstream signal may be transmitted to a respective upstream optical receiver (Rx) 224 via a respective optical band splitting filter 226.

Figure 3:
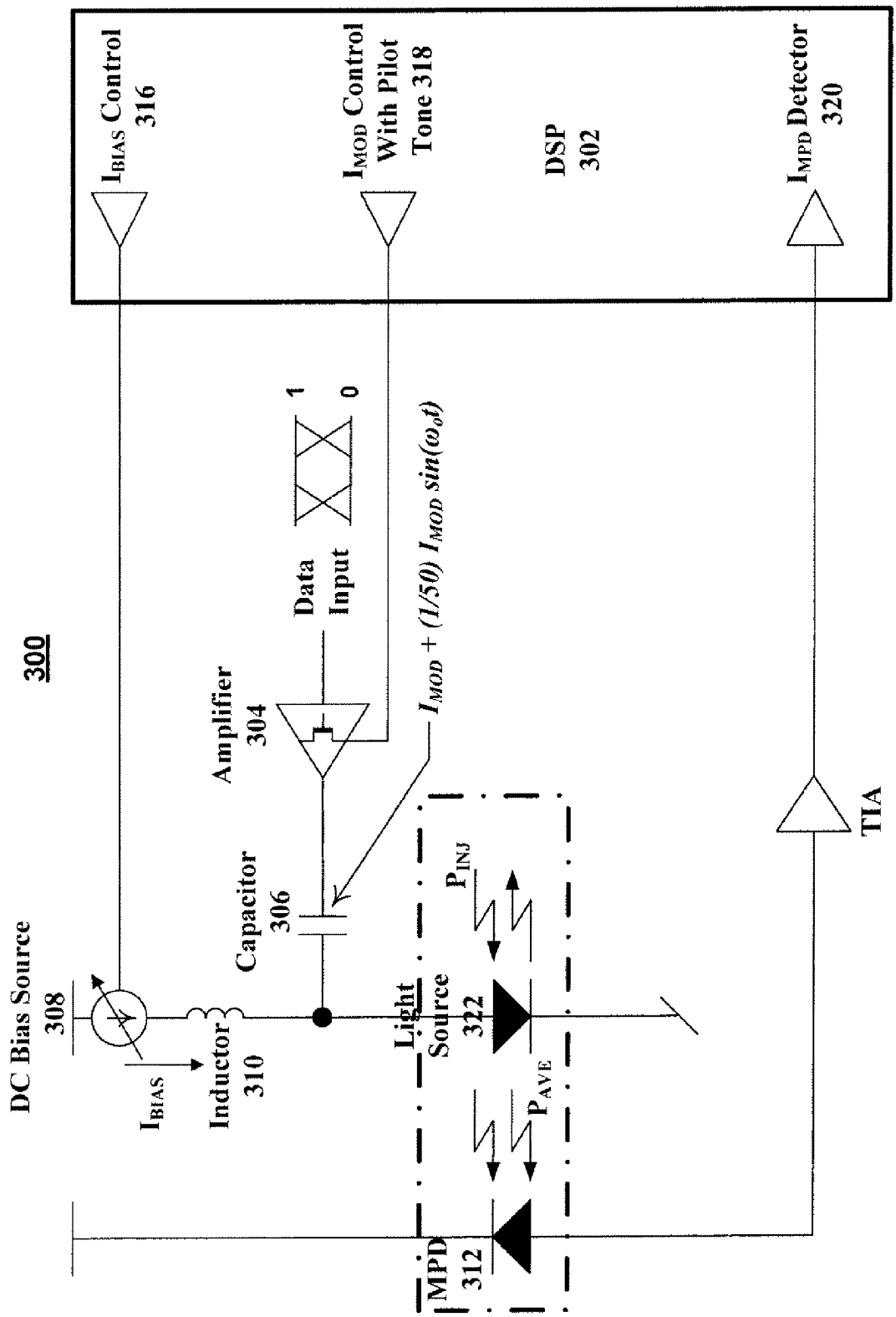
FIG. 3 shows an embodiment of a schematic diagram of a stabilizing circuit for controlling a light source in a wavelength division multiplexed passive optical network (WDM-PON) in accordance with an embodiment of the present disclosure.

Referring to FIG. 3, there is shown an embodiment of a schematic diagram of a monitoring circuit 300 for controlling a light source in the wavelength division multiplexed passive optical network (WDM-PON) in accordance with an embodiment of the present disclosure. The monitoring circuit 300 may comprise a digital signal processing (DSP) device 302 coupled to a light source 322 (e.g., the downstream wavelength-seeded light source (Tx) 222 or the upstream wavelength-seeded light source (Tx) 232 shown in FIG. 2) via an amplifier 304 and a capacitor 306. The monitoring circuit 300 may also comprise a DC bias source 308 configured to generate a bias current ($I_{BIAS}$) to power the light source 322. The DC bias source 308 output the bias current ($I_{BIAS}$) to the light source 322 via an inductor 310. The output power of the light source 322 may be detected by a monitoring photodiode (MPD) 312 and provide the output power to the digital signal processing (DSP) device 302 via a trans-impedance amplifier (TIA) 314.

In an exemplary embodiment, the digital signal processing (DSP) device 302 may control various elements of the monitoring circuit 300. For example, the digital signal processing (DSP) device 302 may comprise a bias current ($I_{BIAS}$) control 316 in order to adjust the bias current ($I_{BIAS}$) generated by the DC bias source 308. The digital signal processing (DSP) device 302 may also comprise a modulation current ($I_{MOD}$) control 318 in order to control the modulation current applied to the light source 322. The digital signal processing (DSP) device 302 may further comprise a monitoring photodiode current ($I_{MPD}$) detector 320 in order to determine an output power detected by the monitoring photodiode (MPD) 312.

Also illustrated in FIG. 3, a pilot tone signal may be generated by the modulation current ($I_{MOD}$) control 318 of the digital signal processing (DSP) device 302. The pilot tone signal may be represented by a sinusoidal function (e.g., sin ($\omega_0 t$)) having an amplitude (D). In an exemplary embodiment, the amplitude (D) of the pilot tone signal may be a fraction (e.g., 1/50) of the amplitude of the modulation current ($I_{MOD}$). In another exemplary embodiment, the amplitude (D) of the pilot tone signal may be an adjustable variable or a function in order to maintain a desired operating condition for the light source 322.

In an exemplary embodiment, the gain (G(t)) of the amplifier 304 may be a constant (e.g. G(0)). The pilot tone signal may be inputted into the amplifier 304 and may cause the amplifier 304 to output an amplitude modulated signal. In an exemplary embodiment, the amplitude modulate signal outputted by the amplifier 304 may oscillate corresponding to the sinusoidal function of the pilot tone signal and have a gain (G(t)=G(0)+D sin($\omega_0 t$)). Also, a modulation current ($I_{MOD}$) representing data to be transmitted (e.g., logic high (binary "1" data state) and logic low (binary "0" data state)) may be inputted into the amplifier 304. The amplifier 304 may modulate (e.g., amplitude modulation (AM)) the modulation current ($I_{MOD}$) representing the data to be transmitted by the pilot tone signal generated by the modulation current ($I_{MOD}$) control 318 and output an AM modulated signal. In an exemplary embodiment, the output AM modulated signal of the amplifier 304 may be represented by ($I_{MOD}$)+(1/50)($I_{MOD}$)sin($\omega_0 t$), wherein the amplitude (D) of the pilot tone signal may be represented by (1/50) ($I_{MOD}$). The output AM modulated signal from the amplifier 304 may be oscillating corresponding to the sin ($\omega_0 t$) function of the pilot tone signal centering on the modulation current ($I_{MOD}$).

The output AM modulated signal from the amplifier 304 may be AC coupled (or capacitively coupled) to the bias current ($I_{BIAS}$) generated by the DC bias source 308 via the capacitor 306. The AC coupled signal may be applied to the light source 322 in order to generate an output signal (e.g., light signal). The output signal from the light source 322 may be detected by the monitoring photodiode (MPD) 312 for processing by the digital signal processing (DSP) device 302. The output signal detected by the monitoring photodiode (MPD) 312 may be a small fraction of the output signal generated by the light source 322 and thus may be amplified by the trans-impedance amplifier 314 before being processed by the digital signal processing (DSP) device 302.

The monitoring photodiode current ($I_{MPD}$) detector 320 of the digital signal processing (DSP) device 302 may detect the output signal from the monitoring photodiode (MPD) 312. The digital signal processing (DSP) device 302 may process the detected signal in order to determine the pilot tone's amplitude of the detected signal. In an exemplary embodiment, the digital signal processing (DSP) device 302 may extract the pilot tone signal from the detected signal in order to determine a calibrated amplitude (CA) during a calibration period. In another exemplary embodiment, the digital signal processing (DSP) device 302 may extract the pilot tone signal from the detected signal in order to determine a detected amplitude (DA). In particular, the digital signal processing (DSP) device 302 may extract the pilot tone signal (e.g., A sin ($\omega_0 t$)) associated with a logic high (e.g., binary "1" data state) and the pilot tone signal (e.g., B sin ($\omega_0 t \pm \pi$)) associated with a logic low (e.g., binary "0" data state). The amplitudes (e.g., A and B) of the extracted pilot tone signal may be different from each other, for example, the amplitude (A) may be greater than the amplitude (B). The calibrated amplitudes (CA) (e.g., A and B) may be stored in the digital signal processing (DSP) device 302 and may be used as a "reference control" of the modulation current ($I_{MPD}$) control 318. In an exemplary embodiment, calibrated amplitude "A" may represent a logic high (e.g., binary "1" data state) calibrated pilot tone amplitude and calibrated amplitude "B" may represent a logic low (e.g., binary "0" data state) calibrated pilot tone amplitude.

In operation, the light source 322 may vary due to various factors, including operating temperature, injection power, injected wavelength, and/or an age of the light source 322. The controlling circuit 300 may monitor the operation of the light source 322 by generating one or more pilot tone signals having a sinusoidal waveform (e.g., sin ($\omega_0 t$)) with an adjustable amplitude (D) via the modulation current ($I_{MOD}$) control 318 of the digital signal processing (DSP) device 302. The pilot tone signal generated by the modulation current ($I_{MOD}$) control 318 may be applied to the light source 322, and the output signal of the light source 322 may be provided to the digital signal processing (DSP) device 302 via the monitoring photodiode (MPD) 312, as described above. In the event that the detected amplitude (DA) of the pilot tone signal does not match the calibrated amplitude (CA), the digital signal processing (DSP) device 302 may perform an iterative process of adjusting the modulation current ($I_{MOD}$) control 318 (e.g., adjusting the modulation current ($I_{MOD}$)) and/or the bias current ($I_{BIAS}$) control 316 (e.g., adjusting the DC bias source 308) until the detected amplitude (DA) (e.g., detected amplitude "A" and "B") matches the calibrated amplitude (CA) (e.g., calibrated amplitude "A" and "B") stored in the digital signal processing (DSP) device 302.

Figure 4:
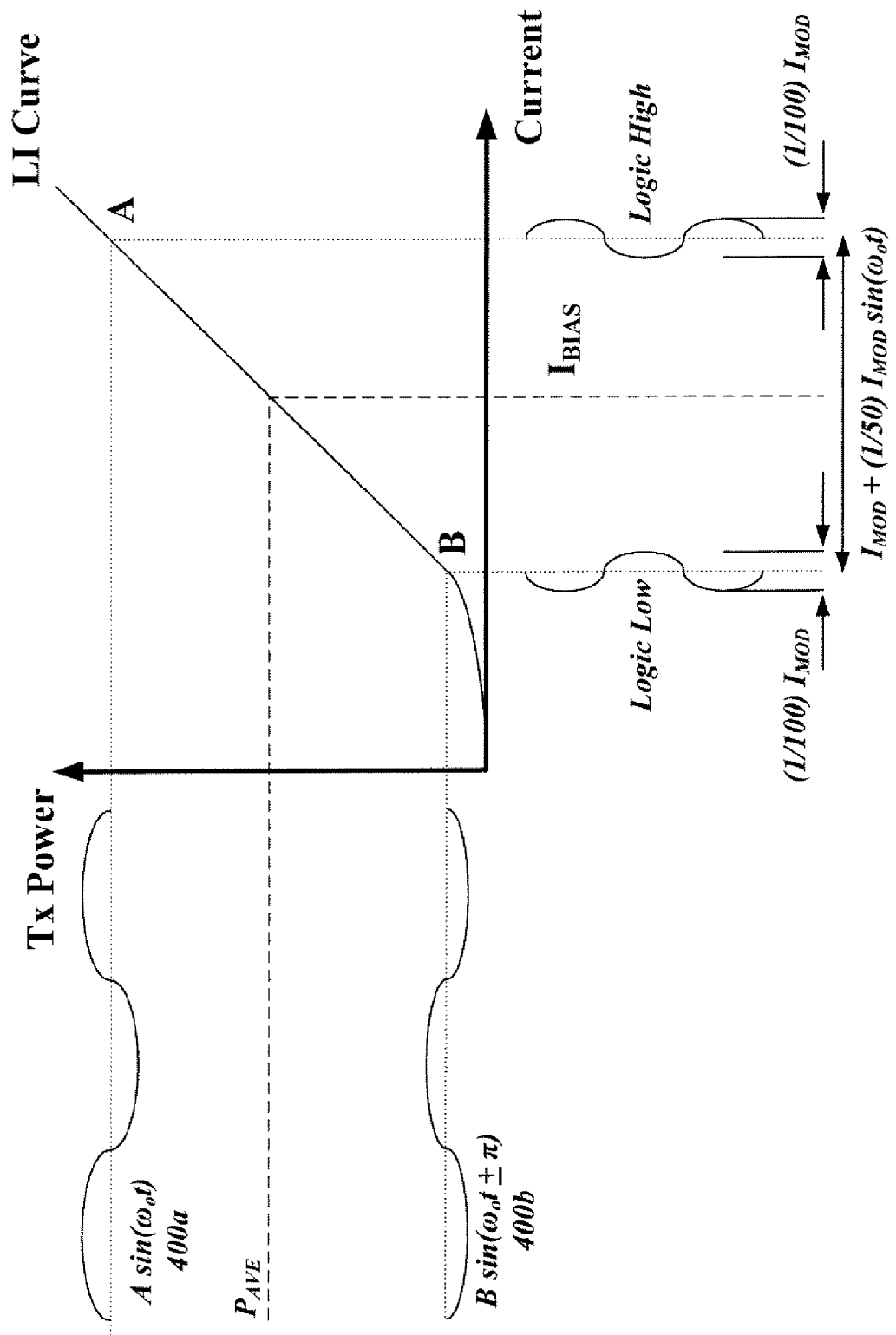
FIG. 4 shows a graph illustrating an embodiment of a pilot tone signal applied to a light source in the wavelength division multiplexed passive optical network (WDM-PON) in accordance with an embodiment of the present disclosure.

Referring to FIG. 4, there is shown a graph illustrating an embodiment of a pilot tone signal applied to a light source in the wavelength division multiplexed passive optical network (WDM-PON) in accordance with an embodiment of the present disclosure. The pilot tone signal 400 may be generated by the modulation current ($I_{MOD}$) control 318 of the digital signal processing (DSP) device 302 (e.g., shown in FIG. 3). The pilot tone signal 400 may comprise a logic high (e.g., binary "1" data state) pilot tone signal 400a and a logic low (e.g., binary "0" data state) pilot tone signal 400b. In an exemplary embodiment, the logic high (e.g., binary "1" data state) pilot tone signal 400a may be illustrated by a sinusoidal waveform having an amplitude (A), for example, A sin ($\omega_0 t$). The logic low (e.g., binary "0" data state) pilot tone signal 400b may be illustrated by a sinusoidal waveform having an amplitude (B) and a phase shift, for example, B sin ($\omega_0 t \pm \pi$). In an exemplary embodiment, in the electrical domain (e.g., before electrical-to-optical conversion), the amplitude (A) for the logic high (e.g., binary "1" data state) pilot tone signal and the amplitude (B) for the logic low (e.g., binary "0" data state) pilot tone signal may be the same. The tone of the logic high (e.g., binary "1" data state) pilot tone signal and the tone of the logic low (e.g., binary "0" data state) pilot tone signal may be opposite in phase (e.g., a phase shift of $\pi$). In another embodiment, the amplitude of the logic high pilot tone signal 400a (A) and the logic low pilot tone signal 400b (B) may be different. As shown in FIG. 4, the amplitude (A) of the logic high (e.g., binary "1" data state) pilot tone signal 400a may be represented by the slope at point A of the LI curve. Also, the amplitude (B) of the logic low (e.g., binary "0" data state) pilot tone signal 400b may be represented by the slope at point B of the LI curve. The slope at point A may be different than the slope at point B due to the non-linear characteristics of the LI curve.

In an exemplary embodiment, the logic high (e.g., binary "1" data state) pilot tone signal 400a may be established in order to bias the light source 322 above the threshold voltage and/or current (e.g., light source is in an ON-state). The logic low (e.g., binary "0" data state) pilot tone signal 400b may be also established in order to bias the light source 322 above the threshold voltage and/or current (e.g., light source is in an ON-state).

Logic high (e.g., binary "1" data state) and logic low (e.g., binary "0" data state) may be determined based on a bias current ($I_{BIAS}$), a modulation current ($I_{MOD}$), and/or the pilot tone signal 400. In an exemplary embodiment, logic high (e.g., binary "1" data state) may be determined by the summation of the bias current ($I_{BIAS}$), the modulation current ($I_{MOD}$), and the logic high (e.g., binary "1" data state) pilot tone signal 400a. The logic low (e.g., binary "0" data state) may be determined by subtracting the modulation current ($I_{MOD}$) and the logic low (e.g., binary "0" data state) pilot tone signal 400b from the bias current ($I_{BIAS}$). The pilot tone signal 400 may swing between logic high (binary "1" data state) and logic low (binary "0" data state) because of the sinusoidal waveform (e.g., sin ($\omega_0 t$)) and the amplitude for logic high (binary "1" data state) and logic low (binary "0" data state) may be half (e.g., $\frac{1}{100}$ ($I_{MOD}$)) of the total amplitude (e.g., $\frac{1}{50}$ ($I_{MOD}$)).

In an exemplary embodiment illustrated in FIG. 4, the logic high (e.g., binary "1" data state) may be determined by the summation of the bias current ($I_{BIAS}$), the modulation current ($I_{MOD}$), and/or the logic high (e.g., binary "1" data state) pilot tone signal 400a (e.g., ($I_{BIAS}$)+($I_{MOD}$)+($\frac{1}{100}$)sin($\omega_0 t$)). Also, the logic low (e.g., binary "0" data state) may be determined by subtracting the modulation current ($I_{MOD}$) and the logic low (e.g., binary "0" data state) pilot tone signal 400b from a bias current ($I_{BIAS}$) (e.g., ($I_{BIAS}$)−(($I_{MOD}$)+($\frac{1}{100}$)sin($\omega_0 t+\pi$))).

Figure 5:
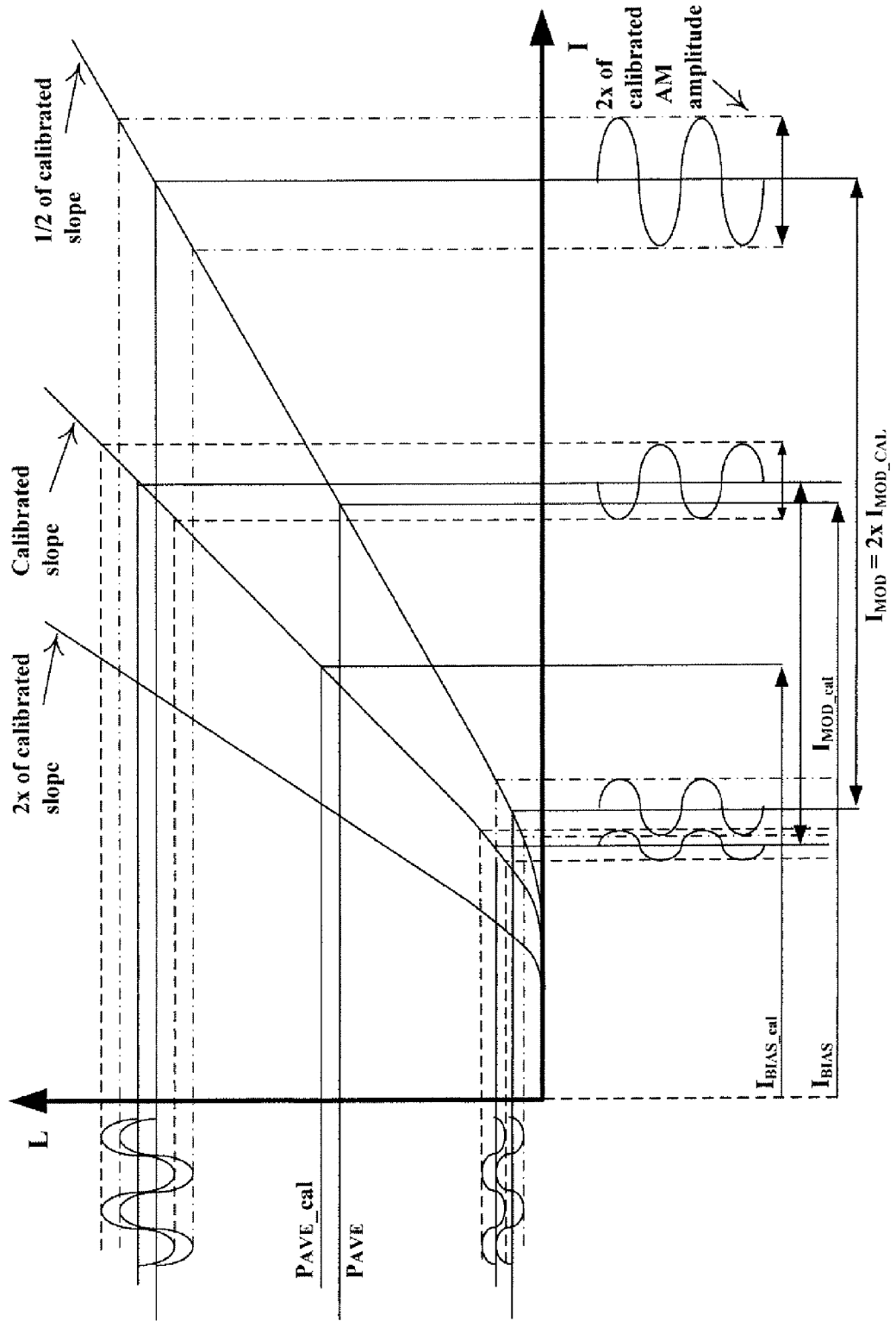
FIG. 5 shows a graph illustrating an embodiment of the relationship between luminescence (L) and bias current (I) in the wavelength division multiplexed passive optical network (WDM-PON) in accordance with an embodiment of the present disclosure.

Referring to FIG. 5, there is shown a graph illustrating an embodiment of the relationship between luminescence (L) and bias current (I) in a wavelength division multiplexed passive optical network (WDM-PON) in accordance with an embodiment of the present disclosure. As illustrated in FIG. 5, three LI curves may be plotted for various operating conditions of a light source (e.g., light source 322 shown in FIG. 3) of a wavelength division multiplexed passive optical network (WDM-PON). For example, a calibrated LI curve having a calibrated slope may be stored in the digital signal processing (DSP) device 302 (e.g., digital signal processing (DSP) device 302 shown in FIG. 3) as a "reference control". The digital signal processing (DSP) device 302 may adjust the modulation current ($I_{MOD}$) control 318 and the bias current ($I_{BIAS}$) control 316 so that the LI curve detected by the digital signal processing (DSP) device 302 matches the calibrated LI curve. In an exemplary embodiment, the digital signal processing (DSP) device 302 may adjust the modulation current ($I_{MOD}$) control 318 based on a logic high (binary "1" data state) pilot tone signal (e.g., 400a). Also, the digital signal processing (DSP) device 302 may adjust the bias current ($I_{BIAS}$) control 316 based on a logic low (binary "0" data state) pilot tone signal (e.g., 400b).

In an exemplary embodiment, the detected LI curve may have a slope that is twice the slope of the calibrated LI curve. The digital signal processing (DSP) device 302 may decrease the bias current ($I_{BIAS}$) via the bias current ($I_{BIAS}$) control 316 and/or decrease the modulation current ($I_{MOD}$) via the modulation current ($I_{MOD}$) control 318. The digital signal processing (DSP) device 302 may iteratively perform such processes until the slope of the detected LI curve matches the slope of the calibrated LI curve.

In an exemplary embodiment, the detected LI curve may have a slope that is half the slope of the calibrated LI curve. The digital signal processing (DSP) device 302 may increase the bias current ($I_{BIAS}$) via the bias current ($I_{BIAS}$) control 316 and/or increase the modulation current ($I_{MOD}$) via the modulation current ($I_{MOD}$) control 318. The digital signal processing (DSP) device 302 may iteratively perform such processes until the slope of the detected LI curve matches the slope of the calibrated LI curve.

Figure 6:
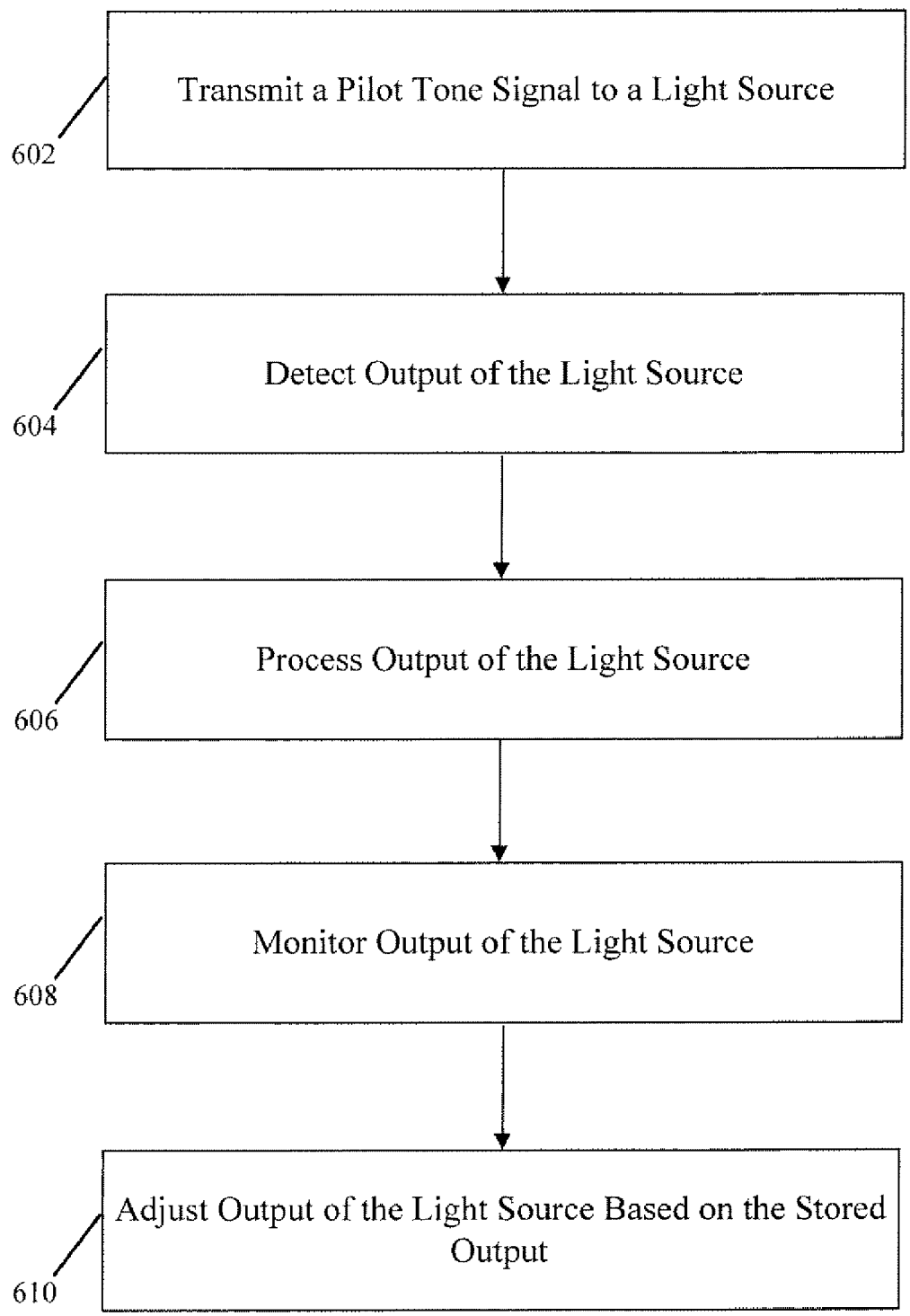
FIG. 6 shows a flowchart for controlling a light source for a wavelength division multiplexed passive optical network (WDM-PON) in accordance with an embodiment of the present disclosure.

Referring to FIG. 6, there is shown a functional diagram illustrating a method 600 for controlling a light source in the wavelength division multiplexed passive optical network (WDM-PON) in accordance with an embodiment of the present disclosure. At block 602, a pilot tone signal 400 may be generated by the modulation current ($I_{MPD}$) control 318 of the digital signal processing (DSP) device 302 and transmitted to the light source 322 during a calibration period. The pilot tone signal 400 may comprise a logic high (e.g., binary "1" data state) pilot tone signal 400a and a logic low (e.g., binary "0" data state) pilot tone signal 400b. In an exemplary embodiment, the logic high (e.g., binary "1" data state) pilot tone signal 400a may be illustrated by a sinusoidal waveform having an amplitude (A), for example, A sin ($\omega_0 t$). The logic low (e.g., binary "0" data state) pilot tone signal 400b may be illustrated by a sinusoidal waveform having an amplitude (B) and a phase shift, for example, B sin ($\omega_0 t\pm\pi$). In an exemplary embodiment, a modulation current ($I_{MOD}$) representing data to be transmitted may be modulated (e.g., amplitude modulation) by the pilot tone signal 400 via the amplifier 304 and outputted to the light source 322. The output AM modulated signal may be AC coupled to bias current ($I_{BIAS}$) generated by the DC bias source 308 via the capacitor 306. The AC coupled signal may be applied to the light source 322 in order to generate an output signal (e.g., light signal).

At block 604, the digital signal processing (DSP) device 302 may detect an output signal from the light source 322 via the monitoring photodiode (MPD) 312. The light source 322 may output an optical signal (e.g., light signal) based on the AC coupled signal and the output optical signal may be detected by the monitoring photodiode (MPD) 312. The monitoring photodiode (MPD) 312 may transmit the detected output optical signal from the light source 322 to the monitoring photodiode current ($I_{MPD}$) detector 320 of the digital signal processing (DSP) device 302 via the trans-impedance amplifier 314.

At block 606, the digital signal processing (DSP) device 302 may process the detected output optical signal from the light source 322 to extract a calibrated amplitude (CA). For example, the digital signal processing (DSP) device 302 may process the detected output optical signal from the light source 322 in order to extract the pilot tone signal 400. The digital signal processing (DSP) device 302 may extract the logic high (e.g., binary "1", data state) pilot tone signal 400a (e.g., A sin ($\omega_0 t$)) and/or the logic low (e.g., binary "0" data state) pilot tone signal 400b (e.g., B sin ($\omega_0 t\pm\pi$)). The digital signal processing (DSP) device 302 may store a calibrated amplitude (A) and (B) of the pilot tone signal 400. Under the calibrated condition, the modulation current ($I_{MOD}$) and the bias current ($I_{BIAS}$) applied to the light source 322 may be adjusted in order to achieve a desired transmitting power, an extinction ratio (ER), and an optical eye mask compliancy.

At block 608, the digital signal processing (DSP) device 302 may monitor the light source 322 during an operation period. For example, the modulation current ($I_{MOD}$) control 318 may continuously or periodically transmit one or more pilot tone signals 400 to the light source 322, as described above at block 602. Also, the digital signal processing (DSP) device 302 may detect an output optical signal from the light source 322 via the monitoring photodiode (MPD) 312, as described above at block 604. The digital signal processing (DSP) device 302 may extract the logic high (e.g., binary "1" data state) pilot tone signal 400a (e.g., A sin ($\omega_0 t$)) and/or the logic low (e.g., binary "0" data state) pilot tone signal 400b (e.g., B sin ($\omega_0 t \pm \pi$)) and compare them to the calibrated amplitude (CA) stored in the digital signal processing (DSP) device 302. During the operation period, the output optical signal from the light source 322 may vary due to operating temperature, injection power, injected wavelength, and/or an age of the light source 322. The digital signal processing (DSP) device 302 may monitor the operation of the light source 322.

At block 610, in the event that the detected output optical signal from the light source 322 varies from the stored calibrated amplitude (CA), the digital signal processing (DSP) device 302 may adjust the bias current ($I_{BIAS}$) control 316 and/or the modulation current ($I_{MOD}$) control 318 applied to the light source 322 in order to match the detected amplitude (DA) with the calibrated amplitude (CA) stored in the digital signal processing (DSP) device 302.

In an exemplary embodiment, the detected output optical signal from the light source 322 may have an amplitude higher than the calibrated amplitude (CA). The digital signal processing (DSP) device 302 may decrease the bias current ($I_{BIAS}$) via the bias current ($I_{BIAS}$) control 316 and/or decrease the modulation current ($I_{MOD}$) via the modulation current ($I_{MOD}$) control 318. The digital signal processing (DSP) device 302 may iteratively perform such processes until the amplitude of the detected output optical signal from the light source 322 may match the calibrated amplitude (CA) stored in the digital signal processing (DSP) device 302.

In another embodiment, the detected optical output signal from the light source 322 may have an amplitude lower than the calibrated amplitude (CA) stored in the digital signal processing (DSP) device 302. The digital signal processing (DSP) device 302 may increase the bias current ($I_{BIAS}$) via the bias current ($I_{BIAS}$) control 316 and/or increase the modulation current ($I_{MOD}$) via the modulation current ($I_{MOD}$) control 318. The digital signal processing (DSP) device 302 may iteratively perform such processes until the amplitude of the detected optical output signal matches the calibrated amplitude (CA) stored in the digital signal processing (DSP) device 302.

At this point it should be noted that techniques for controlling a light source in a wavelength division multiplexed passive optical network (WDM-PON) in accordance with the present disclosure as described above may involve the processing of input data and the generation of output data to some extent. This input data processing and output data generation may be implemented in hardware or software. For example, specific electronic components may be employed in a digital signal processing (DSP) device or similar or related circuitry for implementing the functions associated with techniques for controlling a light source in a wavelength division multiplexed passive optical network (WDM-PON) in accordance with the present disclosure as described above. Alternatively, one or more processors operating in accordance with instructions may implement the functions associated with techniques for controlling a light source in a wavelength division multiplexed passive optical network (WDM-PON) in accordance with the present disclosure as described above. If such is the case, it is within the scope of the present disclosure that such instructions may be stored on one or more processor readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A passive optical network comprising:
    a digital signal processor to output a pilot tone signal;
    an amplifier configured to modulate a modulation current and the pilot tone signal, and output an amplitude modulated signal;
    a capacitor configured to AC couple the amplitude modulated signal to a bias current applied to a light source; and
    a monitoring photodiode configured to detect an output optical signal of the light source and transmit the detected output optical signal to the digital signal processor to control the output optical signal of the light source, wherein the digital signal processor is to store a calibrated amplitude and wherein the calibrated amplitude is determined by the digital signal processor based on the detected output optical signal.

2. The passive optical network according to claim 1, wherein the digital signal processor comprises a modulation current controller to generate the pilot tone signal.

3. The passive optical network according to claim 1, wherein the digital signal processor comprises a bias current controller configured to control the bias current via a DC bias source.

4. The passive optical network according to claim 1, wherein the digital signal processor comprises a monitoring photodiode detector configured to receive the detected output optical signal from the monitoring photodiode.

5. The passive optical network according to claim 1, wherein the pilot tone signal comprises at least one of a logic low pilot tone signal and a logic high pilot tone signal.

6. The passive optical network according to claim 5, wherein the logic low pilot tone signal is represented by B sin ($\omega_0 t \pm n$) and the logic high pilot tone signal is represented by A sin ($\omega_0 t$).

7. The passive optical network according to claim 1, wherein the modulation current corresponds to transmitted data of at least one of a logic low data state or a logic high data state.

8. The passive optical network according to claim 1, wherein the pilot tone signal comprises a constant amplitude or a variable amplitude.

9. The passive optical network according to claim 1, wherein the monitoring photodiode is configured to transmit the detected output optical signal to the digital signal processing device via a trans-impedance amplifier.

10. A method for controlling a light source of a passive optical network comprising:
    transmitting a pilot tone signal to a light source;
    detecting a first output optical signal of the light source via a monitoring photodiode during a calibration period;
    processing the first output optical signal of the light source via a digital signal processor to identify and store a calibrated amplitude;

detecting a second output optical signal of the light source via the monitoring photodiode during an operation period to identify a detected amplitude;

comparing the detected amplitude to the calibrated amplitude stored in the digital signal processor; and adjusting at least one of a bias current or a modulation current applied to the light source based on the comparison between the detected amplitude and the calibrated amplitude.

11. The method according to claim 10, wherein the pilot tone signal comprises at least one of a logic low pilot tone signal and a logic high pilot tone signal.

12. The method according to claim 10, wherein the logic low pilot tone signal is represented by $B \sin(\omega_0 t \pm n)$ and the logic high pilot tone signal is represented by $A \sin(\omega_0 t)$.

13. The method according to claim 10, wherein transmitting a pilot tone signal to a light source further comprises generating the pilot tone signal via a modulation current control of the digital signal processor.

14. The method according to claim 10, wherein transmitting a pilot tone signal to a light source further comprises amplitude modulating a modulation current by the pilot tone signal via an amplifier to output an amplitude modulated signal.

15. The method according to claim 14, further comprises AC coupling the amplitude modulated signal to a bias current generated by a DC bias source.

16. The method according to claim 10, wherein detecting a first output optical signal of the light source via a monitoring photodiode during a calibrated period further comprises transmitting the first detected output optical signal to a monitoring photodiode current detector of the digital signal processor via a trans-impedance amplifier.

17. The method according to claim 10, wherein processing the first output optical signal of the light source further comprises extracting a sinusoidal portion of the first output optical signal to identify the calibrated amplitude.

18. The method according to claim 10, wherein adjusting at least one of a bias current or a modulation current applied to the light source comprises adjusting at least one of a modulation current control of the digital signal processor and a bias current control of the digital signal processor.

19. The method according to claim 10, wherein the pilot tone signal comprises a constant amplitude or a variable amplitude.

20. A non-transitory storage medium for storing a computer program of instructions configured to be readable by at least one processor, the computer program including:

first code to transmit a pilot tone signal to a light source;

second code to detect a first output optical signal of the light source via a monitoring photodiode during a calibration period;

third code to process the first output optical signal of the light source via a digital signal processor to identify and store a calibrated amplitude;

fourth code to detect a second output optical signal of the light source via the monitoring photodiode during an operation period to identify a detected amplitude;

fifth code to compare the detected amplitude to the calibrated amplitude stored in the digital signal processor; and sixth code to adjust at least one of a bias current or a modulation current applied to the light source based on the comparison between the detected amplitude and the calibrated amplitude.

* * * * *